United States Patent
Förster

[11] Patent Number: 6,145,809
[45] Date of Patent: Nov. 14, 2000

[54] ACTUATOR FOR AN ELECTROMAGNETICALLY ADJUSTABLE VALVE

[75] Inventor: Andreas Förster, Schweinfurt, Germany

[73] Assignee: Mannesmann Sachs AG, Schweinfurt, Germany

[21] Appl. No.: 09/414,620

[22] Filed: Oct. 8, 1999

[30] Foreign Application Priority Data

Oct. 9, 1998 [DE] Germany ............................ 198 46 543

[51] Int. Cl.[7] ............................ F16K 31/02; F16K 51/00; F16K 43/00
[52] U.S. Cl. ...................... 251/285; 251/129.15; 137/316
[58] Field of Search ............................ 137/316; 251/284, 251/285, 129.15

[56] References Cited

U.S. PATENT DOCUMENTS

| | | | |
|---|---|---|---|
| 2,704,554 | 3/1955 | Russell et al. | 251/285 |
| 2,761,647 | 9/1956 | Zeck | 251/285 |
| 2,930,404 | 3/1960 | Kowalski et al. | 251/285 |
| 3,428,291 | 2/1969 | Callahan, Jr. et al. | 251/284 |
| 3,601,362 | 8/1971 | Gunther | 251/285 |
| 4,730,640 | 3/1988 | Moen | 251/284 |

FOREIGN PATENT DOCUMENTS

| | | | |
|---|---|---|---|
| 4137821 A1 | 5/1993 | Germany | F16F 9/46 |
| 19722216 A1 | 1/1998 | Germany | F16F 9/46 |
| 19710051 A1 | 9/1998 | Germany | F15B 13/044 |
| 19716856 A1 | 10/1998 | Germany | F16K 31/06 |

Primary Examiner—Kevin Shaver
Assistant Examiner—David A. Bonderer
Attorney, Agent, or Firm—Cohen, Pontani, Lieberman & Pavane

[57] ABSTRACT

An actuator for an electromagnetically adjustable valve having a drive unit which moves an adjustment element in at least one direction. The adjustment element is divided into at least two assemblies and includes a stroke setting that can be adjusted with respect to a defined operating position, within an adjustment process. The actuator has a reference plane on which a stop can be attached as a setting device. One assembly of the adjustment element enters into operative connection with the stop during the assembly process, and the other assembly of the adjustment element is held in a defined operating position by a positioning device. The two assemblies of the adjustment element can be connected using a securing device which is effective in at least one direction.

13 Claims, 4 Drawing Sheets

37

ACTUATOR FOR AN ELECTROMAGNETICALLY ADJUSTABLE VALVE

BACKGROUND OF THE INVENTION

1. Field of the Invention

The invention relates to actuators, and more particularly, to actuators for an electromagnetically adjustable valve.

2. Description of the Related Art

An actuator for an electromagnetically adjustable valve is known, for example, from DE 41 37 821 A1. The actuator comprises a coil which exerts a magnetic force on an armature as an adjustment element for a valve. Actuators are frequently composed of a plurality of individual components whose individual tolerances influence the operating behavior of the actuator. In an electromagnetic actuator, the usable operating travel distance of the adjustment element and the effective force are significant and essential operating parameters. In order to more precisely enable compliance with these influencing variables, the adjustment element in DE 41 37 821 A1 is of a design which is divided into two assemblies and provided with an adjustment device. The adjustment device is composed of a threaded connection between the two assemblies of the adjustment element. The adjustment device can be used to set the entire length of the adjustment element to a defined dimension. The defined longitudinal dimension is in a ratio to the central housing orifice of the actuator which is covered by a closure screw which has sealing rings for sealing the housing orifice. The end-side distance between the closure screw and the rear of the adjustment element determines the maximum stroke of the adjustment element. The setting of the adjustment screw is defined by the necessary level of prestressing of the sealing rings. Consequently, for a longitudinal dimension X for the adjustment element to be set correctly, the operating stroke is determined taking into account the tolerances of the depth of the housing orifice and the screw-in length of the closure screw. The possible tolerance influences have indeed been reduced, but the effect of the tolerances can still be measured.

This type of adjustment device requires an additional protection of the setting length of the adjustment element, for example by means of a thread paste. Otherwise, the possibility of the length setting not being adjusted while the actuator is operating or during the setting of the spring prestress of the springs within the adjustment element is not excluded. The size of the components must also be taken into consideration. The real size of the individual components is significantly smaller so that the threaded connection is significantly weaker than presumed, with the operating pressure in the throughflow duct (reference numeral 8) acting on the threaded connection.

SUMMARY OF THE INVENTION

The object of the present invention is to develop an actuator such that the stroke length is determined as precisely as possible with a low level of fabrication complexity.

This and other objects are achieved in accordance with the invention by virtue of the fact that the actuator has a reference plane on which a stop can be attached as a setting means. A first assembly of the adjustment element which is of divided design enters into an operative connection with the stop during the assembly process, and a second assembly of the adjustment element is held in a defined operating position by means of a positioning device. It is now possible to connect the two assemblies of the adjustment element using securing means which are effective in at least one direction.

The stroke setting of the adjustment element can be set in the actuator because the reference plane is part of the actuator itself. Furthermore, a simple stop can be used. In contrast with a measurement procedure as in DE 41 37 821 A1, a simple test procedure is necessary when setting the stroke.

In a further embodiment one of the two assemblies can penetrate the other assembly and provide a form fit connection between the two assemblies as the securing means. In this way, the form fit connection can be formed by at least one radial projection in one assembly which engages into a corresponding depression in the other assembly.

Alternatively, it is possible for one of the two assemblies to have a shoulder which is fitted with a tolerance sleeve. The tolerance sleeve may be pressed into an opening in the other assembly so that the two assemblies are supported by means of the tolerance sleeve. Furthermore, the loadability of the form fit can be increased by means of a corresponding roughness of the assemblies which are placed in a press fit. It is also contemplated to use a bonding agent.

The reference plane is thus advantageously formed by a housing component which is fixedly arranged with respect to the defined operating position.

In yet a further embodiment, the defined operating position corresponds to a limit position of the adjustment element. It has proven particularly advantageous if the limit position of the adjustment element is formed by a valve seat within a valve which is actuated by the actuator. The valve seat position and the reference plane may have, for example, a structural relationship so that in this respect very small fabrication tolerances can be expected.

In another further embodiment, the two assemblies are arranged in series with one another, and a compensation element arranged between the assemblies, can be deformed in the operating direction of the actuator. The compensation element has, after the adjustment procedure, a length which is shortened in comparison with the initial state. At least the respective dimensional tolerances of the components involved are compensated by means of the compressive travel.

In this way and in the adjusted state of the adjustment element, the compensation element is deformed beyond the elastic state. On the one hand, a relatively small compressive force is desired and on the other hand the recoil must not be too pronounced. For this purpose, provision is made for the material for the compensation element to have the smallest possible ratio of tensile yield strength/modulus of elasticity.

Extensive experimentation has revealed that with regard to the fabrication precision and the assembly costs it is advantageous if the compensation element is formed by a corrugated ring.

In one application of the actuator of the present invention, for example in the case of an oscillation damper with adjustable damping force in which the adjustment element controls the flow of a hydraulic fluid in a valve, it is advantageous with respect to oscillations of the adjustment element if the adjustment element has at least one throttle orifice through which hydraulic fluid flows and thus exerts a damping effect, particularly with respect to an oscillating relative movement between the armature assembly and the slide assembly.

In order to avoid clamping forces there is provision for a plurality of throttle orifices to be symmetrically provided in the adjustment element.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be explained in more detail with reference to the following description of the figures wherein.

DETAILED DESCRIPTION OF THE PRESENTLY PREFERRED EMBODIMENTS

Figure 1:
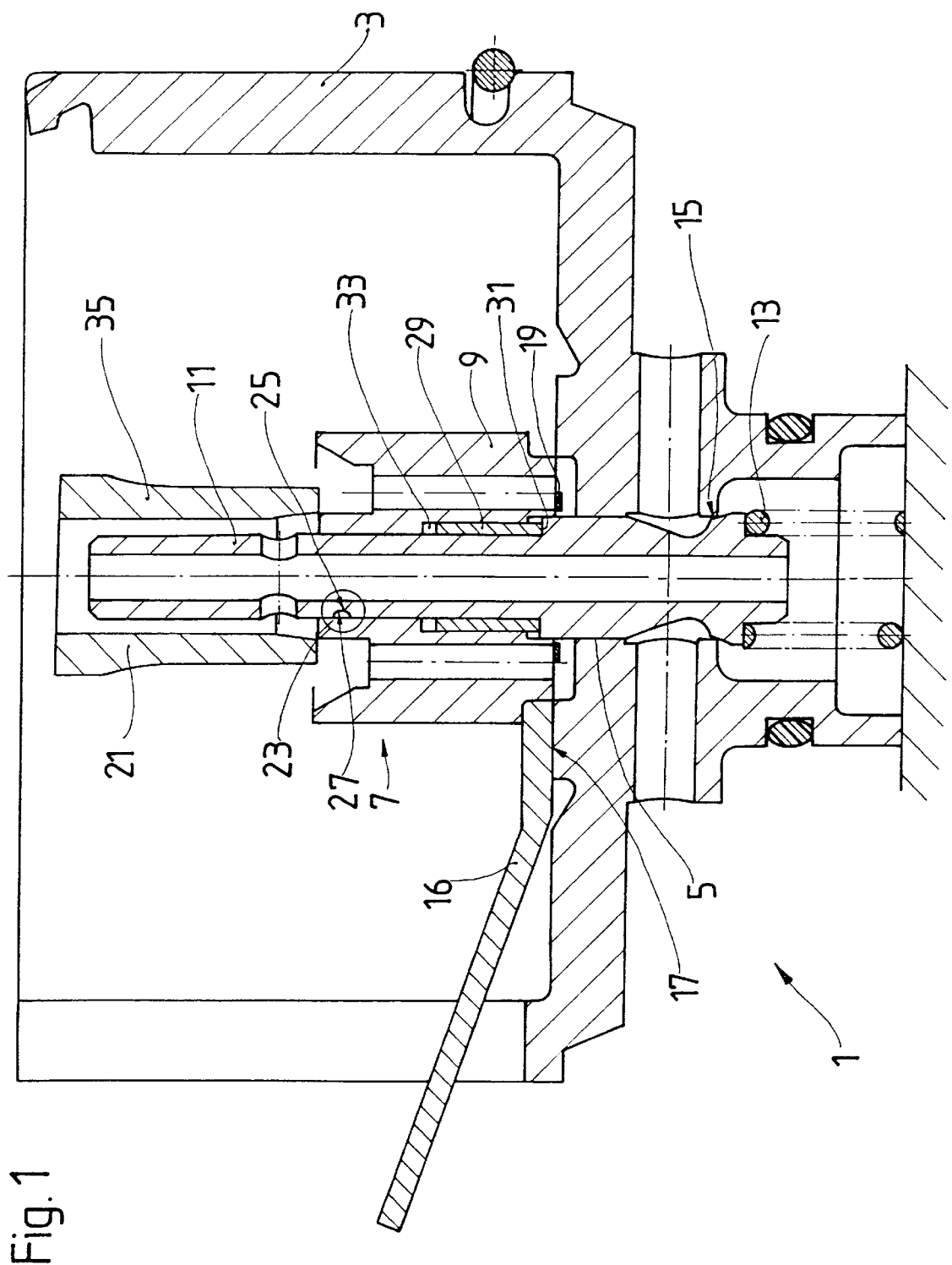
FIG. 1 is a sectional view of an actuator according to an embodiment of the invention.

FIG. 1 shows a partially mounted actuator 1, such as is known from DE 197 22 216 A1. The contents of this patent application should be understood in their entirety as being part of the following description of the figures. Alternatively, in addition to the generation of force by means of a coil as described in DE 197 22 216, it is also possible to use motor-driven, pneumatic, hydraulic or piezoelectric actuating forces.

In this assembly stage, the actuator 1 is composed of a pot-shaped housing 3 with a continuous opening 5 for receiving an adjustment element 7. The adjustment element is composed of two assemblies 9 and 11. Specifically, an armature assembly 9 and a slide assembly 11, which can both be prestressed by the actuation force against a closing spring 13 against a valve seat 15. The valve seat 15 thus constitutes a limit position of the adjustment element 7.

In the assembly state illustrated in FIG. 1, housing 3 is not yet connected to the oscillation damper, but rather is located on an assembly plate. For this reason, the force of the closing spring 13 may be an order of magnitude greater than the spring which is used at this location in the completely assembled actuator.

The slide assembly 11 and the armature assembly 9, are concentrically aligned with respect to one another such that slide assembly 11 penetrates armature assembly 9. In the left-hand half-section, a stop 16, which bears on a reference plane 17 of the housing 3, is illustrated in simplified form. During the assembly process, the armature assembly 9 is threaded, together with a spacing washer 19 onto slide assembly 11 until it comes to rest against the stop 16. Stop 16 has a height at least equal to the height of the provided stroke of the adjustment device plus the height of the spacing washer 19. The spacing washer 19 has the purpose of ensuring that, at very large switching speeds of the actuator, the armature assembly does not enter into contact with the reference plane 17 resulting from oscillatory movement which is effected by mass inertia, and that magnetic adhesion effects do not occur.

In the embodiment according to the left-hand half-section of FIG. 1, a caulking tool 21 is used to enable securing means in the form of a form fit connection 23 between armature assembly 9 and slide assembly 11 to become effective. The form fit connection 23 is composed of at least one radial projection 25 which engages into a corresponding depression 27.

In the right-hand sectional half, a tolerance sleeve 29 is shown supported on a shoulder 31 of the slide assembly 11. Tolerance sleeve 29 is congruent, within an orifice 33, in armature assembly 9. The depth of the orifice 33 corresponds at least to the length of the tolerance sleeve. A pressing tool 35 presses the armature assembly 9 onto the tolerance sleeve until the stop 16 is reached. The axial assembling forces which occur here are absorbed by the closing spring 13.

The form fit connection can be determined in terms of the absorbable force in the operating direction by giving an appropriate roughness to the parts which are involved in the press fit. In addition, or alternatively, bonding agents are conceivable. In the event of the assembling forces being greater than can be absorbed by a spring, an adjustment screw can also be used to support the slide assembly, by way of replacement. The housing 3 comprises not only the reference plane 17 but also the valve seat face 15. In accordance with the present invention, it is possible to directly measure, and thus very precisely fabricate, the distance between plane 17 and valve seat face 15 particularly if housing 3 is loaded on the reference plane while the valve seat 15 is being processed. Spring 13 constitutes a positioning device for the slide assembly 11. Alternatively, the adjustment screw which is described can also be considered to be a positioning device. It is important for the slide assembly 11 to be held in a defined axial position of the armature assembly 9 until the fixing means are effective.

Figure 2:
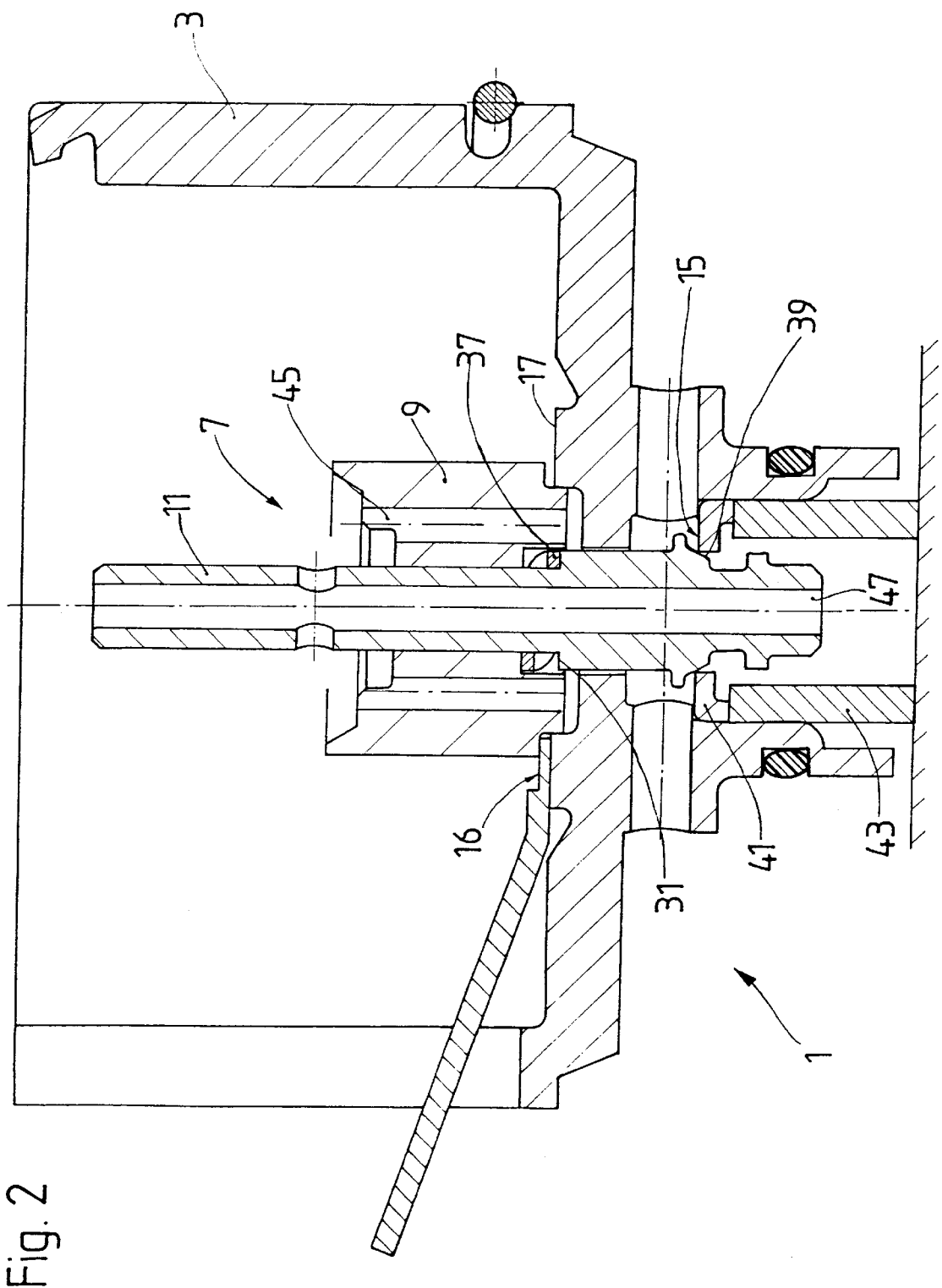
FIG. 2 is a sectional view of an actuator according to another embodiment of the invention.

The embodiment according to FIG. 2 shows an actuator in the same state of assembly as the embodiment according to FIG. 1. In contrast, a compensation element 37 serves as securing means between the armature assembly 9 and the slide assembly 11. The slide assembly 11 is in turn inserted into the housing 3 with its position being determined by a valve face 39 of the valve slide 11. The valve seat 15 bears on a valve ring 41, which is held by a supporting sleeve 43 during the assembly phase. The valve ring 41 thus forms the positioning device, in conjunction with the supporting sleeve 43 and a prestressing force (not shown) exerted on the slide assembly 11 in the axial direction. The compensation element 37, which can be formed by a corrugated ring, is positioned on the shoulder 31 of the slide assembly 11 as a securing means. Subsequently, the stop 16, whose height corresponds to the spacing washer 19 in FIG. 1 is in turn secured at the reference plane 17. Then, a press tool (not illustrated), axially displaces the armature assembly in the direction of the valve seat 15 until the armature assembly 9 comes to rest against the stop 16. Here, the compensation element 37 is essentially elastically deformed. The material for the compensation element 37 is selected to have a low recoil which has already been taken into account in the height of the stop 16.

Between armature assembly 9 and slide assembly 11 a distance is set which is matched in turn to the stroke setting and stroke length. The loading in the axial direction is effected during operation by the spring forces employed in the actuator, so that undesired relative movements do not occur between the armature assembly and the slide assembly. Any oscillatory movements are dissipated by the armature assembly which has throttle orifices 45 through which hydraulic fluid flows when the actuator is operating, the fluid being received by the actuator through a central orifice 47 and flowing to the rear of the armature assembly.

Figure 3:
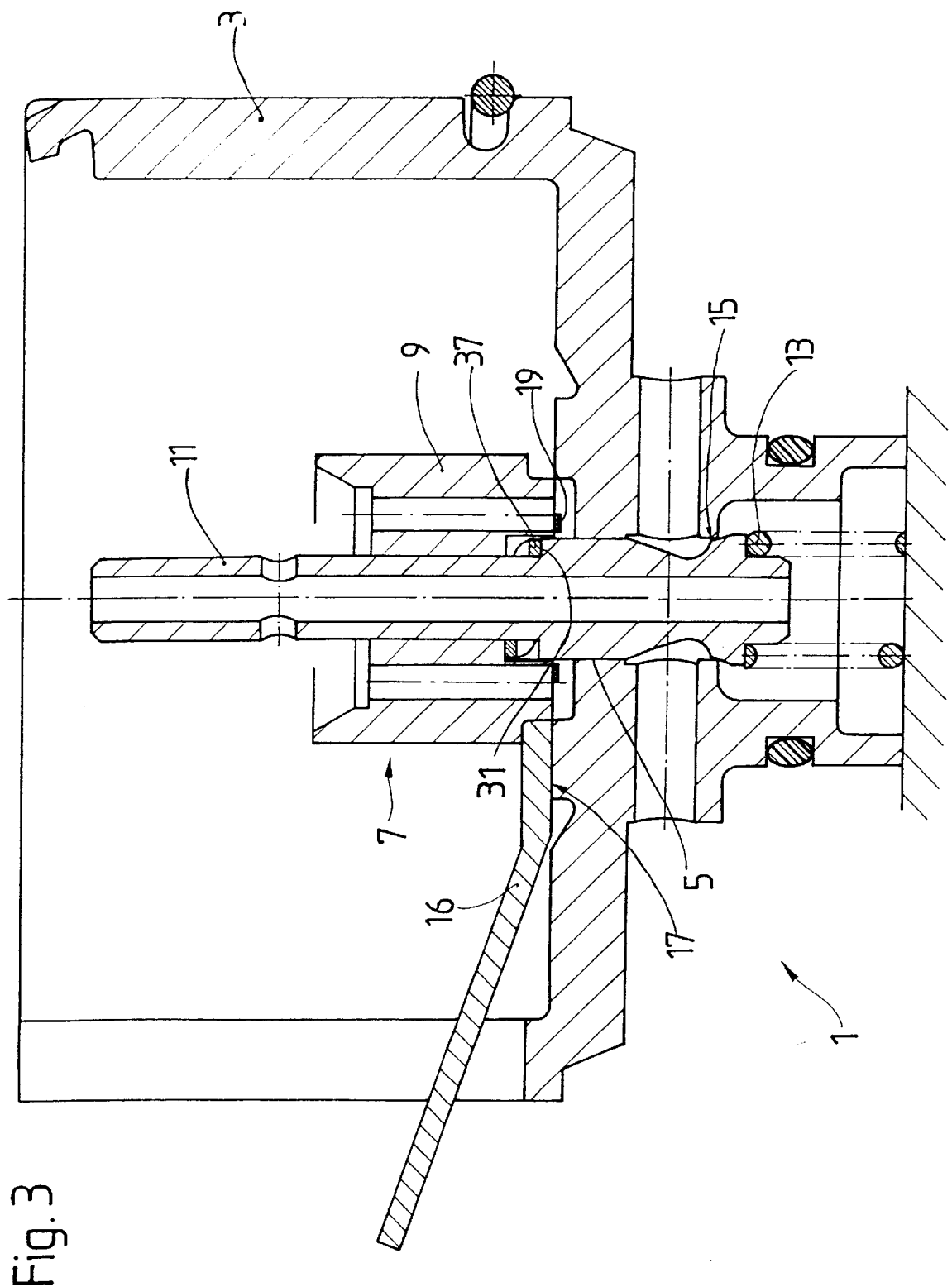
FIG. 3 is a sectional view of the actuator of FIG. 1 having a compensation element shown in FIG. 2.

FIG. 3 is intended to illustrate how an actuator with the design of the valve seat according to FIG. 1 can also be fitted with the compensation element 37 described in the embodiment of FIG. 2. The assembly procedure corresponds to the procedure according to FIG. 2.

Figure 4A:
FIGS. 4a–4c show top, side and elongated views of the compensation element from FIG. 2 as an individual component.
Figure 4B:
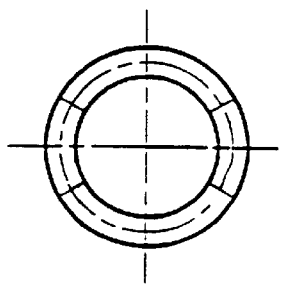
Figure 4C:

FIG. 4 shows the corrugated ring from FIGS. 2 and 3 as compensation element 37. The compensation element can certainly also have a modified appearance (e.g. FIG. 4c). The important factor is sufficient deformability in conjunction with a low level of compliance and recoil. The corrugated ring combines these properties because the spring effect decreases as a planar position is increasingly adopted and no recoil of appreciable magnitude occurs if there is overextension into the plastic region.

The invention is not limited by the embodiments described above which are presented as examples only but can be modified in various ways within the scope of protection defined by the appended patent claims.

I claim:

1. An actuator for an electromagnetically adjustable valve comprising:
   a drive unit;
   an adjustment element being driven by said drive unit in at least one direction and having at least two assemblies having a stroke setting adjustable with respect to a defined operating position;
   a reference plane having a stop acting as a setting device for operatively connecting with one of said two assemblies of the adjustment element during an assembly process;
   a positioning device for maintaining the other of said two assemblies of the adjustment element in the defined operating position; and
   securing means effective in at least one direction for connecting said two assemblies of the adjustment element.

2. The actuator in accordance with claim 1, wherein one of said two assemblies at least partially engages into the other of said assemblies in a completely assembled state of said adjustment element, wherein said securing means comprises a form fit between said two assemblies.

3. The actuator in accordance with claim 2, wherein said form fit comprises at least one radial projection on one of said two assemblies and a corresponding depression form in the other of said two assemblies.

4. The actuator in accordance with claim 2, wherein one of said two assemblies comprises a shoulder being fitted with a tolerance sleeve, and the other of said two assemblies comprises an opening for receiving said tolerance sleeve, wherein said tolerance sleeve being pressed into said opening so as to support said two assemblies.

5. The actuator in accordance with claim 1, wherein said reference plane comprises a housing component fixedly arranged within said housing with respect to the defined operating position.

6. The actuator in accordance with claim 1, wherein the defined operating position comprises a limit position of said adjustment element.

7. The actuator in accordance with claim 6, further comprising a valve seat for the valve, wherein said limit position is formed by said valve seat.

8. The actuator in accordance with claim 1, wherein said two assemblies are arranged in series and the actuator further comprises a compensation element arranged between said two assemblies and having an initial state length and capable of being deformed in an operating direction of the actuator, said initial state length being shortened after an adjustement procedure.

9. The actuator in accordance with claim 8, wherein said compensation element is deformed beyond an elastic state in an adjusted state of the adjustment element.

10. The actuator in accordance with claim 9, wherein said compensation element comprises a corrugated ring.

11. The actuator in accordance with claim 9, wherein said compensation element comprises a material having a smallest possible ratio of tensile yield strength/modulus of elasticity.

12. The actuator in accordance with claim 1, wherein said adjustment element further comprises at least one throttle orifice through which hydraulic fluid flows, said adjustment element controlling the flow of hydraulic fluid in the valve.

13. The actuator in accordance with claim 12, wherein said adjustment element comprises a plurality of throttle orifices symmetrically about said adjustment element.

* * * * *